United States Patent [19]

Sims

[11] 3,838,979

[45] Oct. 1, 1974

[54] SULFUR RECOVERY PROCESS

[75] Inventor: Anker V. Sims, Redondo, Calif.

[73] Assignee: Thermo-Mist Company, Downey, Calif.

[22] Filed: Apr. 15, 1971

[21] Appl. No.: 134,511

Related U.S. Application Data

[63] Continuation-in-part of Ser. No. 778,083, Nov. 22, 1968, abandoned.

[52] U.S. Cl............... 23/293 S, 23/294, 23/308 S, 423/567, 423/578
[51] Int. Cl.................. B01d 7/00, C01b 17/08
[58] Field of Search.... 23/308 S, 312 S, 294, 293 S; 423/567, 578

[56] References Cited
UNITED STATES PATENTS

| 1,409,338 | 3/1922 | Fenton | 23/294 |
|---|---|---|---|
| 2,087,893 | 7/1937 | Bacon | 423/577 |
| 2,127,859 | 8/1938 | D'Aragon | 423/577 |
| 2,508,292 | 5/1950 | Porter | 423/567 |
| 2,687,344 | 8/1954 | Conroy | 23/294 |
| 2,821,461 | 1/1958 | Aannerud | 23/308 S |
| 2,877,100 | 3/1959 | Hartley | 423/578 |
| 3,102,792 | 9/1963 | Eads | 23/308 S |

FOREIGN PATENTS OR APPLICATIONS

| 408,669 | 4/1934 | Great Britain | 23/308 S |

Primary Examiner—Norman Yudkoff
Assistant Examiner—S. J. Emery
Attorney, Agent, or Firm—Christie, Parker & Hale

[57] ABSTRACT

Sulfur is continuously recovered from native sulfur-bearing ore by heating the ore within a vessel to produce a sulfur vapor, condensing the sulfur vapor within the vessel by direct heat exchange with incoming ore, and collecting the condensed sulfur. The gas from which the condensed sulfur is collected is recycled by passing it into the sulfur recovery vessel where it absorbs heat from the spent ore. The condensation of sulfur vapor occurs by direct heat exchange with cold, incoming ore so that heat loss is minimal. Sufficient time is allowed for the sulfur to age before it is collected to avoid difficulties in collecting amorphous sulfur.

16 Claims, 3 Drawing Figures

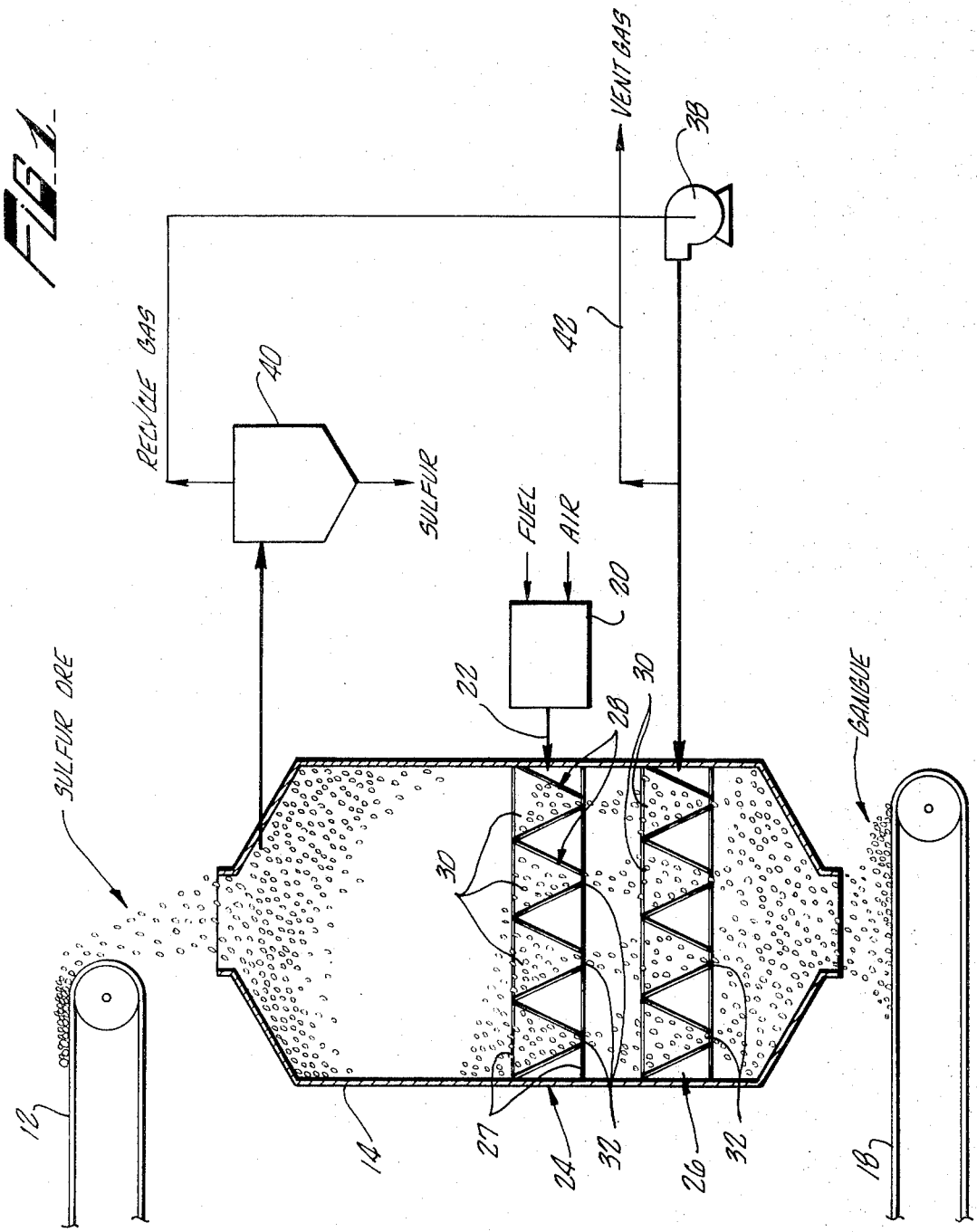

PATENTED OCT 1 1974 3,838,979
SHEET 2 OF 2
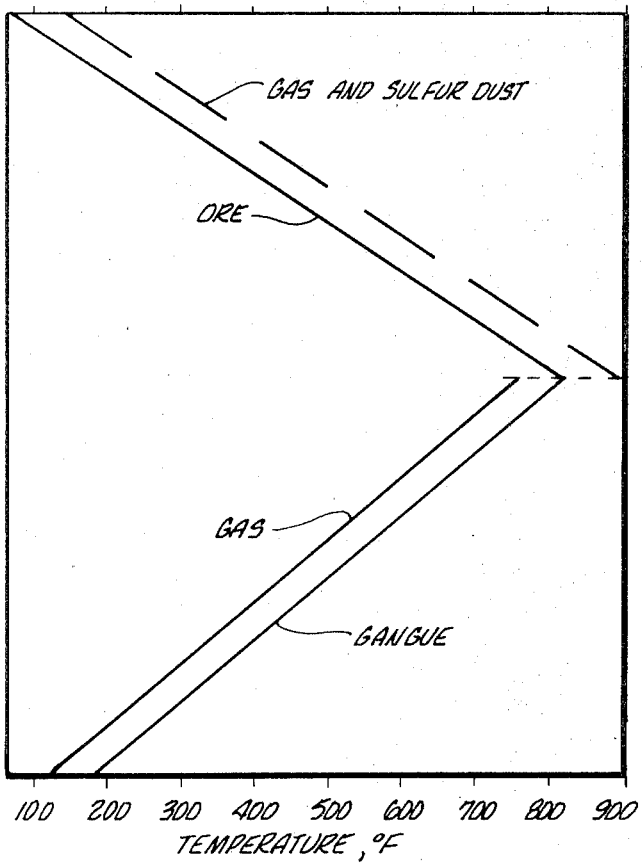
FIG_3_
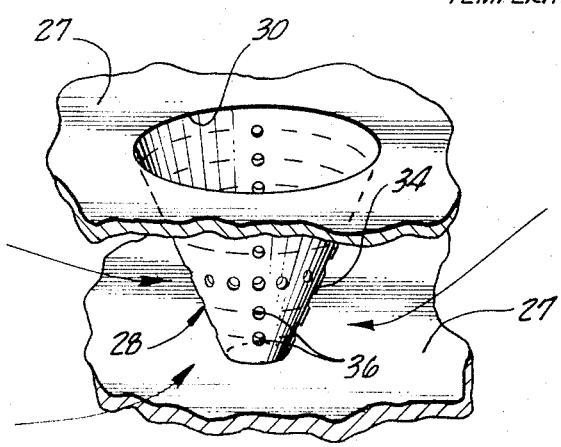
FIG_2_
INVENTOR.
ANKER V. SIMS
BY
Christie, Parker & Hale
ATTORNEYS

SULFUR RECOVERY PROCESS

CROSS-REFERENCE TO RELATED APPLICATIONS

This is a continuation-in-part application of application Ser. No. 778,083, filed Nov. 22, 1968, now abandoned.

BACKGROUND OF THE INVENTION

This invention relates to the recovery of sulfur products and more particularly concerns the recovery of elemental sulfur from sulfur-containing ore.

Numerous industrial techniques are presently employed for the recovery of sulfur from native ores containing it in uncombined form. In general, they are characterized either by inefficient sulfur yield or by requiring complex and expensive equipment. For example, a typical recovery process requires the distillation of sulfur from the ore in externally heated retorts. This technique necessitates complex and expensive equipment and yet fails to allow the recovery of high amounts of sulfur. Additionally, the process ordinarily is discontinuous and fails to make efficient use of heat employed in the recovery system. Similarly, processes utilizing hot water to process low grade ores have generally failed to yield economically feasible amounts of sulfur. Moreover, such techniques are generally characterized by low heat efficiency and high operating costs due to the difficulties in obtaining water.

Sulfur recovery by solvent extraction, using carbon disulfide and the like has also been proposed. This method does allow recovery of higher amounts of sulfur but is disadvantageous in that the solvent required is usually expensive. Moreover, solvent losses are relatively high, a feature which not only adds to the cost of the operation but often presents safety hazards to personnel.

Various other methods, such as those utilizing mechanical separation principles, have been found to yield less than satisfactory amounts of sulfur. For example, flotation or air tabling ordinarily cannot be employed to produce high purity sulfur at a satisfactory recovery level. The mechanical techniques have also been proven less than adequate in that they often require costly treatment of the ore, such as fine grinding preparatory to its being fed into the separation apparatus.

Another sulfur recovery method of interest utilizes a heated gas which is passed through the ore to vaporize the sulfur. The sulfur vapor-containing gas mixture emerging from the heating apparatus is then passed to a condenser for sulfur recovery. This technique represents an improvement over the above methods in that the heat efficiency of the system is significantly increased as a result of directly contacting the heated gas with the ore. That is, heat transfer within the vaporization vessel is significantly improved. The overall heat loss in the system, however, has remained higher than desired primarily because of the heat lost in cooling the gas mixture to condense the sulfur. An excessive amount of heat is also lost when the spent ore is discharged from the vaporization apparatus. Attempts at improving the efficiency of heat utilization such as by heat exchange between entering and exiting gas streams have been only partially successful and generally have required additional equipment.

STATEMENT OF THE INVENTION

In accordance with this invention high sulfur recovery is accomplished by a continuous process wherein ore is heated within a sulfur recovery vessel to produce a sulfur vapor, the sulfur vapor then being condensed within the vessel by direct contact with cold incoming ore. The sulfur product is collected from the condensed sulfur vapor and remaining gas is recycled to the vessel, passing in countercurrent contact with the flowing ore such that it absorbs heat from the gangue, which is then discharged.

The sulfur-bearing ore preferably is fed into a vertically disposed vessel having a sulfur recovery zone at its upper end, and flows under gravity through the vessel, discharging at the bottom. Sulfur vapor generated by the heated ore is forced by a gas blower into the sulfur recovery zone. The blower also serves to pass the recycle gas through the vessel countercurrent to the flow of ore. The recycle gas thus absorbs heat from the gangue at the bottom of the vessel and loses heat to the incoming ore in the sulfur recovery zone prior to being recycled. Additionally, the heat of the recycle gas acts in combination with another heat source, such as hot combustion gases, to vaporize sulfur from the incoming ore.

The sulfur vapor is condensed to a liquid or solid state by direct heat exchange with the cold incoming ore. The resultant condensate is passed to a conventional collection apparatus such as a bag filter for recovery of the sulfur product. Preferably, sulfur is condensed and removed from the retort as a solid dust or fume. The sulfur can also be condensed as a liquid mist by operating the upper section of the sulfur recovery zone at a higher temperature and using a suitable collection device such as a hot wall cyclone. The heat recovery efficiency using the latter technique is somewhat lower than that obtained when the sulfur is removed as a fume, since the recycle gas usually is at a higher temperature. The lower heat recovery, however, is satisfactory in cases where the sulfur product is required to be in liquid form.

It is generally preferred, however, because of heat recovery economies to condense the sulfur to a sulfur fume. It has been found that fume is originally generated in amorphous form making separation of the fume from its transporting recycle gas difficult. It has been found, however, that if the fume is allowed to age briefly, say 30 seconds, the fume agglomerates into larger particles and the sulfur changes into its stable crystalline form. It is preferred, therefore, to allow the fume to age, typically in its transporting recycle gas, before separating the fume from the recycle gas. When this is done, cyclone separators with their economies can be used because the average particle size is large enough for cyclone separation. Even if not all the fume is separated from the recycle gas, that which is not separated can be recycled with the recycle gas. It is also possible to employ two cyclone separators in series. With this arrangement, the first separator separates out of recycle gas gangue dust before agglomeration of the sulfur. The second cyclone separates the agglomerized and crystalline sulfur from the recycle gas. With these series cyclones a purer sulfur product obviously results.

The process of this invention is particularly advantageous in that it affords excellent heat recovery. Heat transfer between the recycle gas and solid ore is accomplished using direct countercurrent heat exchange and by removing the sulfur from the recovery vessel as a low temperature solid or liquid. It is thus possible to recover heat added to the recycle gas during the heating step before it leaves the recovery vessel. Similarly, the gangue is cooled before leaving the retort, giving up its heat to the incoming recycle gas. Since the amount of heat required to bring sulfur-bearing ore to a temperature high enough to vaporize the sulfur is quite large, especially in the case of a low-grade ore, the efficient heat recovery of this invention affords an extremely economical recovery process.

Ore having large particle sizes can be readily treated in accordance with this invention, thereby avoiding the costs of grinding normally associated with conventional separation techniques. Particles having diameters of up to several inches can be easily handled in conventional sized vessels with excellent heat transfer efficiency. Furthermore, in contrast to recovery methods using fluidized beds and expensive gas blowers for maintaining the ore in a fluidized condition, and as a result of the low pressure drop across the ore bed, it is possible to utilize simple, low-cost blowers. Also, because of the excellent heat recovery afforded within the vessel, the blower is required to handle only relatively cool gas streams, so that the actual volume of gas is minimized and special construction materials are not necessary.

The equipment required for utilization of the sulfur recovery process of this invention is both simple and inexpensive and can be operated in a continuous manner. High sulfur yields can be obtained using a single-bed retort, although retorts with two or more beds are also advantageous. Similarly, fluidized or combinations of fluidized and non-fluidized beds can be employed. The overall simplicity of the process yields numerous advantages. For example, the process does not require water, an important advantage in sulfur deposit regions where water is scarce.

BRIEF DESCRIPTION OF THE FIGURES

FIG. 1 is a schematic view of the sulfur recovery process of this invention;

FIG. 2 is a fragmentary perspective view of apparatus utilized in the process shown in FIG. 1; and FIG. 3 is a temperature profile for the sulfur recovery apparatus shown in FIG. 1.

DESCRIPTION OF THE PREFERRED EMBODIMENTS

Sulfur-bearing ore, typically having a concentration of about 20 percent by weight, is continuously fed from a conveyor belt 12 into the upper section of a sulfur recovery vessel 14. To prevent process gas from escaping from the top of the vessel, a seal may be provided. The ore flows by gravity through the vessel and, after treatment, exits at the bottom as gangue, being discharged onto a second conveyor belt 18. Fuel and air or oxygen are subjected to combustion within a burner 20 disposed adjacent the mid-point of the vessel, the burner being connected with the interior of the vessel by a duct 22. To avoid oxidizing elemental sulfur, the oxygen is totally consumed. That is, the fuel and oxidizer are combined typically with the fuel supplied a little in excess of that required for stoichiometric. Because of the danger in oxidizing sulfur, it is preferred to burn the oxygen and fuel outside the recovery vessel. Hot combustion gases generated in the burner are passed through the duct into the mid-portion of the recovery vessel for circulation with the downwardly flowing ore.

Heating of the incoming ore is preferably carried out in combination with a cone flow process, as is effected in cone flow zones 24, 26, shown in FIG. 1. Partitions 27 define the upper and lower boundaries of the zones. Each zone has a plurality of inverted frusto-conical passages 28 communicating with upper and lower sections of the vessel. In upper zone 24 incoming sulfur ore passes into the large diameter openings 30 and flows through the cones and out the small diameter openings 32. The frusto-conical passages are shaped to bound the cone flow developed by freely flowing, particled sulfur ore. As shown in FIG. 2, the wall 34 of the frusto-conical passage 28 has a plurality of inlets 36 through which hot combustion gases from the burner are circulated to heat the downwardly flowing sulfur ore. As a result, dead spaces are eliminated between the openings of the conical passages in which particled solids undergo cone flow. The frusto-conical passages prevent the accumulation of ore between such openings, resulting in the elimination of areas of non-flowing solids and enhancing the transfer of heat from the hot gases to the ore. Both lateral and vertical mixing of the ore particles is achieved, thereby assuring uniform heat transfer. The cone flow process also eliminates the requirement for expensive mechanical mixing devices and allows the treatment of different sized ores.

The elemental sulfur vapor produced by heat treatment with the hot combustion gases and recycle gas is forced upwardly in the vessel by a gas blower 38. The upwardly flowing vapor is subjected to cooling by direct heat exchange with the incoming cold ore, such that it is condensed within the upper portion of the retort to form a fine solid dust or fume. Alternatively, though not preferred because better heat reclamation occurs when the sulfur is condensed to fume, the sulfur can be condensed into a sulfur liquid mist. The gas after the condensation step which contains the elemental sulfur as an entrained fume is then passed from the top of the vessel into one or more cyclone separators 40.

It has been found that the elemental sulfur fume formed by the present invention is largely in the amorphous state when first generated. Amorphous sulfur is sticky and thus tends to cause difficulties in separating it from its transporting gas stream. It has been found, however, that if the fume is allowed to age for a relatively short period of time two things happen. Initially, the sulfur agglomerates into larger particles. Secondly, the amorphous sulfur changes into crystalline sulfur. The sulfur's particle size after agglomeration and its crystalline state means that economical cyclone separators can be used. One of the advantages of the sulfur fume initially having a very small particle size is that it can pass through a first cyclone separation stage without separating from its transporting gas stream, and gangue dust can be removed at this stage. Implicit in this advantage is the requirement that the first cyclone separation stage be sufficiently early after fume formation to avoid substantially agglomerized sulfur which would itself separate out of the gas stream.

In the event that the sulfur is condensed into a fine liquid mist, it is preferred that the mist be separated from the transporting gas stream by a hot wall cyclone.

After recovery of the sulfur, the resultant recycle gas is returned to the sulfur recovery vessel by the gas blower. A portion of the recycle gas, after recovery of the sulfur fume, is vented to the air through line 42.

The gangue is discharged from the bottom of the vessel through a discharging device (not shown) that forms a gas seal and regulates the flow of the spent ore. The recycle gas passing from the gas blower is introduced adjacent the bottom of the vessel into the second cone flow zone where it circulates as described above. The upwardly directed recycle gas thereby absorbs heat from the gangue before the latter is discharged from the vessel so as to achieve excellent heat recovery.

FIG. 3 shows a temperature profile for the sulfur recovery process shown in FIG. 1. The sulfur-bearing ore, typically at an initial temperature of about 60°F., is heated to a temperature in excess of 800°F. to produce the sulfur vapor. The gangue is cooled by incoming recyle gas entering the bottom of the recovery vessel, the gangue being reduced in temperature to less than 200°F. before discharge. Correspondingly, the recycle gas, as indicated by the dashed line, increases in temperature as it passes through the gangue such that the recycle gas can aid in heating the cold incoming ore. The recycle gas and sulfur vapor produced at the midpoint of the vessel, as indicated by the peak of the temperature profile, are at a temperature of about 900°F., the excess temperature resulting from incoming hot combustion gases. The recycle gas, containing the entrained sulfur fume, decreases in temperature on contact with the cold incoming ore, leaving the vessel at a temperature in excess of about 100°F.

For example, 100 pounds of an ore containing 20 percent by weight of sulfur can be introduced into the sulfur recovery vessel at 60°F. and discharged from such vessel as gangue at a temperature of 180°F. The recycle gas, which is forced upwardly through the vessel and recycled through the cyclone separators and returned to the lower portion of the vessel, enters and leaves the vessel at a temperature of about 120°F. During processing, heat is transferred to and removed from the vessel as follows:

| Heat In | BTU/100 lb. Ore | % of Total |
|---|---|---|
| Heat Transferred to Ore | 19,350 | 88.6 |
| Heat to Vaporize Sulfur | 2,480 | 11.4 |
| | 21,830 | 100.0 |

| Heat Out | BTU/100 lb. Ore | % of Total |
|---|---|---|
| Heat Recovered from Gangue | 13,080 | 59.9 |
| Heat Recovered from Condensing Sulfur | 2,480 | 11.4 |
| Heat Recovered from Solid Sulfur | 3,570 | 16.3 |
| Recovered Heat | 19,130 | 87.6 |

The 2,700 BTU difference between the heat introduced to the vessel, 21,830 BTU's, and the heat removed from the vessel, 19,130 BTU's, represents heat loss to the gangue in an amount of 2,400 BTU's and heat loss to the sulfur recovery in an amount of 300 BTU's. The recovered heat is 87.6 percent of the heat introduced into the vessel, the lost heat consisting of 11 percent heat loss to the gangue; the remaining portion is lost to sulfur recovery.

What is claimed is:
1. A process for recovering a sulfur product from a sulfur-bearing ore comprising:
   a. continuously passing the sulfur-bearing ore through a vessel having a sulfur recovery zone in the upper portion of the vessel;
   b. heating the ore in the sulfur recovery zone by countercurrent direct heat exchange with a recycle gas, thereby cooling the recycle gas;
   c. heating the ore in a heating zone within the vessel to produce a sulfur vapor product and gangue, the heating zone being below the sulfur recovery zone and upstream therefrom with respect to gas flow;
   d. condensing a substantial portion of the sulfur vapor within the sulfur recovery zone by direct heat exchange with incoming ore;
   e. transporting the condensed sulfur from the recovery zone in a gas stream which includes the recycle gas;
   f. collecting the condensed sulfur to yield the sulfur product and the recycle gas; and
   g. passing the recycle gas, after being cooled in accordance with step (b), through the vessel countercurrent to the flow of ore at a point upstream from the heating zone with respect to gas flow such that heat is absorbed by the recycle gas from the gangue prior to its discharge.

2. The process of claim 1 wherein the ore is heated in the heating zone by hot gases generated from the combustion of a fuel and air mixture and by recycle gas previously heated by passage through the gangue.

3. The process of claim 1 wherein the sulfur vapor is subjected to countercurrent direct heat exchange with incoming ore such that the sulfur vapor is condensed to a solid fume.

4. The process of claim 3 wherein the condensed sulfur vapor, in the form of a solid fume, is passed from the upper section of the vessel to a cyclone separator for recovery of the sulfur product.

5. The process of claim 1 wherein the sulfur vapor is subjected to countercurrent direct heat exchange with incoming ore sufficient to form a sulfur liquid mist.

6. The process of claim 5 wherein the sulfur liquid mist is passed from the upper section of the vessel to a hot wall cyclone for recovery of the sulfur product.

7. The process of claim 1 wherein the cooled recycle gas is passed through the vessel countercurrent to the flow of ore by a gas blower.

8. The process of claim 1 wherein the gangue leaves the sulfur recovery vessel through a discharging device that forms a seal and regulates the flow of ore.

9. The process of claim 1 wherein the sulfur recovery vessel has means for effecting the cone flow of ore through the heating zone of the vessel.

10. The process of claim 1 wherein the sulfur recovery vessel is vertically disposed such that ore flows by gravity through the vessel, a gas blower being provided for passing the recycle gas countercurrent to the flow of ore.

11. The process claimed in claim 1 wherein the ore is heated in the heating zone by hot gases generated from the combustion of a fuel and air mixture and by recycle gas previously heated by passage through the gangue, the fuel and air being combined to consume essentially all available oxygen to avoid the oxidation of elemental sulfur.

12. The process claimed in claim 1 wherein the condensing step includes condensing the sulfur vapor to a solid fume of amorphous sulfur by direct heat exchange with incoming ore in the sulfur recovery zone; and including the step of aging the amorphous fume to form crystalline sulfur prior to the collection step.

13. The process claimed in claim 12 wherein the aging step is in the gas stream prior to the collection step.

14. The process claimed in claim 12 including the step of agglomerating the sulfur fume before collection.

15. The process claimed in claim 14 wherein the gas stream from the sulfur recovery zone is subjected to a first stage of cyclone separation to separate gangue dust therefrom before the sulfur agglomerates substantially.

16. The process claimed in claim 15 wherein the sulfur is collected by a second stage cyclone.

* * * * *